United States Patent
Jung

(10) Patent No.: US 9,903,286 B2
(45) Date of Patent: Feb. 27, 2018

(54) APPARATUS FOR CONTROLLING ENGINE AND METHOD FOR CONTROLLING ENGINE

(71) Applicant: HYUNDAI MOTOR COMPANY, Seoul (KR)

(72) Inventor: In Soo Jung, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 59 days.

(21) Appl. No.: 14/956,256

(22) Filed: Dec. 1, 2015

(65) Prior Publication Data
US 2017/0067406 A1    Mar. 9, 2017

(30) Foreign Application Priority Data
Sep. 8, 2015   (KR) .................. 10-2015-0127103

(51) Int. Cl.
| | | |
|---|---|---|
| F02D 41/28 | (2006.01) | |
| F02D 35/02 | (2006.01) | |
| F02D 41/22 | (2006.01) | |
| F02D 41/40 | (2006.01) | |

(52) U.S. Cl.
CPC .......... *F02D 35/023* (2013.01); *F02D 41/402* (2013.01); *F02D 41/221* (2013.01); *F02D 41/401* (2013.01); *F02D 41/403* (2013.01); *F02D 2041/224* (2013.01); *F02D 2041/288* (2013.01); *F02D 2200/025* (2013.01); *Y02T 10/44* (2013.01)

(58) Field of Classification Search
CPC ...... F02D 35/02; F02D 35/023; F02D 35/028; F02D 2200/025
USPC .......................................... 123/435; 701/111
See application file for complete search history.

(56) References Cited

U.S. PATENT DOCUMENTS

| | | | | |
|---|---|---|---|---|
| 9,169,793 | B2 * | 10/2015 | Jung | F02D 41/30 |
| 9,255,543 | B2 * | 2/2016 | Jung | F02D 41/403 |
| 9,506,419 | B2 * | 11/2016 | Jung | F02D 41/403 |
| 2014/0012487 | A1 * | 1/2014 | Jung | F02D 41/30 701/104 |
| 2014/0172276 | A1 * | 6/2014 | Jung | F02D 41/403 701/104 |
| 2014/0349807 | A1 * | 11/2014 | Heap | B60W 20/10 477/3 |

(Continued)

FOREIGN PATENT DOCUMENTS

| | | |
|---|---|---|
| JP | 2001-234800 A | 8/2001 |
| KR | 10-0380063 B1 | 4/2003 |

(Continued)

*Primary Examiner* — Sizo Vilakazi
*Assistant Examiner* — Kevin R Steckbauer
(74) *Attorney, Agent, or Firm* — McDermott Will & Emery LLP

(57) ABSTRACT

A method of calculating a nitrogen oxide (NOx) mass reduced from a lean NOx trap (LNT) during regeneration includes calculating a C3H6 mass flow used to reduce the NOx among a C3H6 mass flow flowing into the LNT of an exhaust purification device, calculating a NH3 mass flow used to reduce the NOx among a NH3 mass flow flowing into the LNT, calculating a reduced NOx mass flow based on the C3H6 mass flow used to reduce the NOx and the NH3 mass flow used to reduce the NOx, and calculating the reduced NOx mass by integrating the reduced NOx mass flow over a regeneration period.

6 Claims, 3 Drawing Sheets

(56) References Cited

U.S. PATENT DOCUMENTS

| | | | | |
|---|---|---|---|---|
| 2015/0354493 A1* | 12/2015 | Jung | ................... | F02D 35/024 |
| | | | | 701/105 |
| 2015/0369147 A1* | 12/2015 | Itoh | ..................... | B60W 20/10 |
| | | | | 701/22 |
| 2016/0025032 A1* | 1/2016 | Jung | ................... | F02D 41/403 |
| | | | | 701/104 |
| 2016/0108848 A1* | 4/2016 | Jung | ................... | F02D 41/403 |
| | | | | 123/299 |
| 2016/0146125 A1* | 5/2016 | Jung | ..................... | F02D 41/22 |
| | | | | 123/478 |
| 2016/0341135 A1* | 11/2016 | Shirahashi | ........... | F02D 35/027 |

FOREIGN PATENT DOCUMENTS

| | | |
|---|---|---|
| KR | 10-0482551 B1 | 4/2005 |
| KR | 10-0534725 B1 | 12/2005 |
| KR | 10-2014-0005403 A | 1/2014 |

* cited by examiner

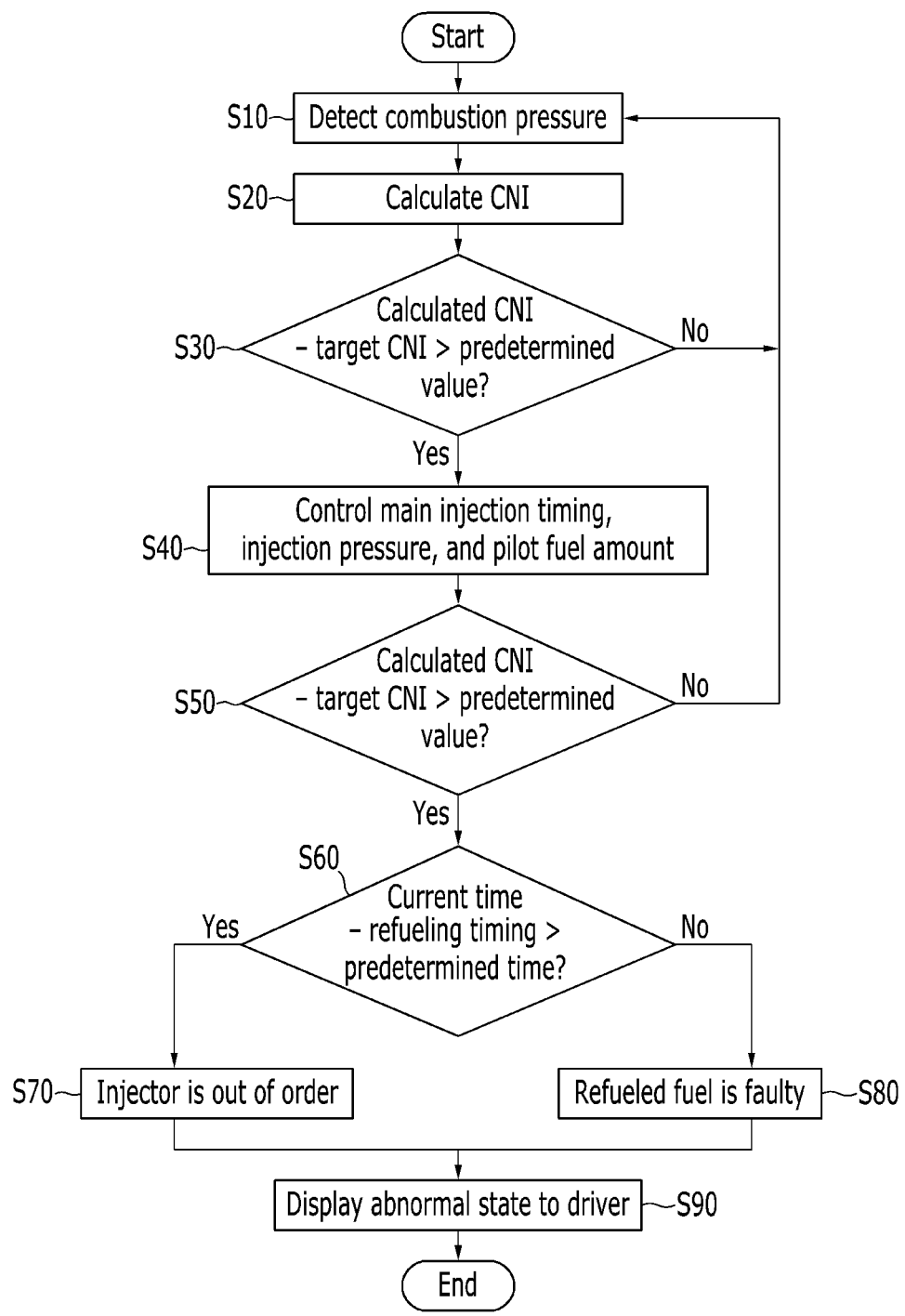

APPARATUS FOR CONTROLLING ENGINE AND METHOD FOR CONTROLLING ENGINE

CROSS-REFERENCE TO RELATED APPLICATION

This application claims the benefit of priority to Korean Patent Application No. 10-2015-0127103, filed with the Korean Intellectual Property Office on Sep. 8, 2015, the entire contents of which are incorporated herein by reference.

TECHNICAL FIELD

The present disclosure relates to an apparatus for controlling an engine and a method of controlling an engine. More particularly, the present disclosure relates to an apparatus for controlling an engine and a method that can improve vibration and noise of the engine by using a combustion noise index.

BACKGROUND

Generally, in order to stabilize combustion generated at a combustion chamber of an engine, a method for controlling a main injection timing using a combustion pressure sensor is used. Further, in order to reduce the vibration and noise of the engine, pilot injection is introduced. In the pilot injection, before an injector performs main injection for combustion, a predetermined amount of fuel is previously injected at a predetermined point in time so that a temperature of a combustion chamber is raised and a mixture of fuel and air is improved. The pilot injection is performed at least once and may be performed multiple times in accordance with a driving condition.

Through the pilot injection, ignition delay is reduced and a rate of rise of combustion pressure is reduced. As the rate of rise of the combustion pressure is reduced, combustion noise is reduced.

However, as an operation period of an injector that injects fuel is increased, a main injection amount or a pilot injection amount may become reduced or increased by various causes. Due to the above problems, combustion pressure in the combustion chamber can become varied, and thus vibration and noise of the combustion chamber can become increased.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide an apparatus for controlling an engine that can reduce vibration and noise of a combustion chamber, and achieve combustion stability.

An apparatus for controlling an engine according to an exemplary embodiment of the present disclosure may include a combustion pressure sensor that measures internal combustion pressure of a combustion chamber of an engine; an injector that injects fuel into the combustion chamber; and a controller that converts the combustion pressure measured by the combustion pressure sensor into a combustion noise index (CNI), and controls main injection timing, injection pressure and pilot fuel amount injected by the injector using the combustion noise index.

The controller may calculate the CNI by converting the combustion pressure sensor through FFT (Fast Fourier Transformation).

When a difference between the measured combustion noise index and a target combustion noise index is greater than a predetermined value, the controller may determine that abnormal combustion is generated and controls main injection timing, injection pressure and pilot fuel amount.

The target combustion noise index may be determined by an experiment according to engine speed, fuel amount injected into the combustion chamber, gear shift stage, external temperature and coolant temperature.

When the difference between the measured combustion noise index and the target combustion noise index is greater than the predetermined value after the main injection timing, the injection pressure, and the pilot fuel amount are controlled, the controller may determine that the injector is inoperable or refueling fuel is faulty from a refueling timing.

The controller may determines that the refueling fuel is faulty when a difference between the refueling timing and current time is less than a predetermined time, and the injector is inoperable when the difference between the refueling timing and current time is greater than the predetermined time.

An method for controlling an engine according to another exemplary embodiment of the present disclosure may include measuring internal combustion pressure of a combustion chamber of an engine; converting the combustion pressure into a combustion noise index; comparing the combustion noise index to a target combustion noise index; determining a difference between the combustion noise index and the target combustion noise index is greater than a predetermined value; and controlling main injection timing, injection pressure and pilot fuel amount when the difference between the combustion noise index and the target combustion noise index is greater than the predetermined value.

The combustion noise index may be calculated by converting the combustion pressure through FFT (Fast Fourier Transform).

The target combustion noise index may be determined by a test according to engine speed, fuel amount injected into the combustion chamber, gear shift stage, external temperature and coolant temperature.

The method may further include after controlling main injection timing, injection pressure and pilot fuel amount, comparing the combustion noise index to the target combustion noise index; determining refueling timing: and determining the injector is inoperable or refueling fuel is faulty from a refueling timing.

It may be determined that the refueling fuel is faulty when a difference between the refueling timing and current time is less than a predetermined time, and the injector is inoperable when the difference between the refueling timing and current time is greater than the predetermined time.

According to an exemplary embodiment of the present disclosure, combustion stability of a combustion chamber can be achieved by controlling a main injection timing, an injection pressure, and pilot injection amount by using a combustion noise index converted from a combustion pressure.

Further, if the combustion noise index is not within a target range even though the main injection timing, the injection pressure, and the pilot fuel amount are controlled by using the combustion noise index, it is determined that an injector is inoperable or refueling fuel is faulty.

BRIEF DESCRIPTION OF THE DRAWINGS

The drawings are provided for reference in describing exemplary embodiments of the present disclosure and the scope of the present disclosure is not limited to the accompanying drawings.

FIG. 3 is a flowchart illustrating a method for controlling an engine according to an exemplary embodiment of the present disclosure.

DETAILED DESCRIPTION

Figure 1:
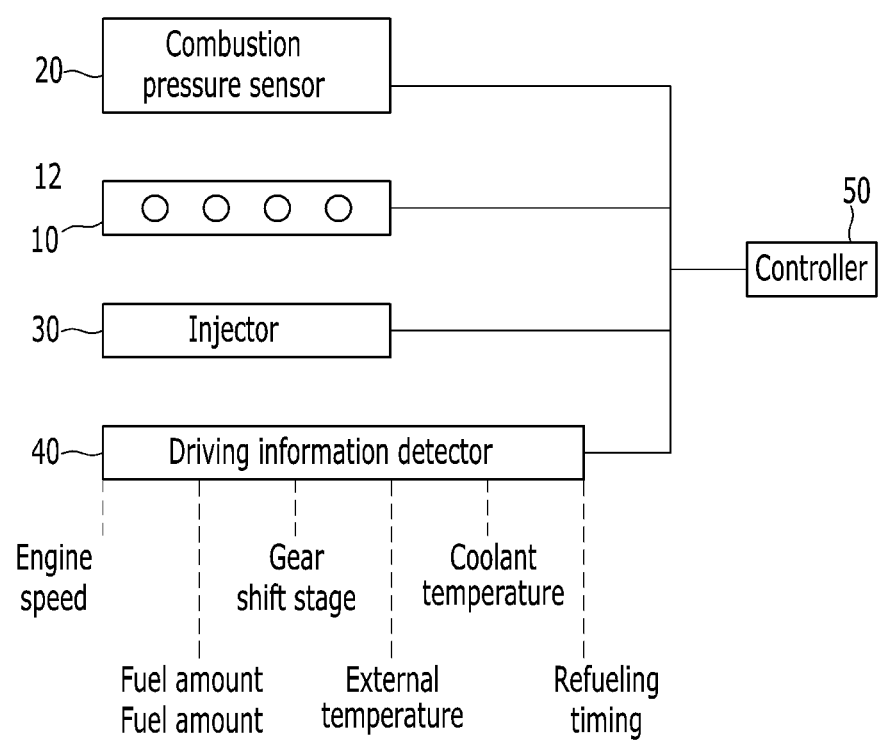
FIG. 1 is a block diagram illustrating an apparatus for controlling an engine according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification.

Further, in the drawings, the sizes and the thicknesses of the components are exemplarily provided for the convenience of description, the present disclosure is not limited to those shown in the drawings, and the thicknesses are exaggerated to clearly show several parts and regions.

An apparatus for controlling an engine according to an exemplary embodiment of the present disclosure will be described in detail with reference to accompanying drawings.

FIG. 1 is a block diagram illustrating an apparatus for controlling an engine according to an exemplary embodiment of the present disclosure.

As shown in FIG. 1, an apparatus for controlling an engine according to an exemplary embodiment of the present disclosure may include an engine 10 including a combustion chamber 12 generating driving torque by combustion of a fuel, a combustion pressure sensor 20 measuring internal combustion pressure of the combustion chamber 12 of the engine 10, an injector 30 injecting fuel into the combustion chamber 12, and a controller 50 converting combustion pressure measured by the combustion pressure sensor 20 into a combustion noise index and controlling main injection timing, injection pressure and pilot fuel amount injected by the injector 30 using the combustion noise index.

The apparatus for controlling the engine according to an exemplary embodiment of the present disclosure may further include a driving information detector 40 detecting engine speed, fuel amount injected into the combustion chamber, gear shift stage, external temperature, coolant temperature, and refueling timing. The driving information detected by the driving information detector 40 may be transmitted to the controller 50.

The injector 30 may inject a predetermined fuel amount into the combustion chamber 12 of the engine 10 at a predetermined timing. The fuel injected by the injector 30 may be divided into main injection and pilot injection.

Generally, the main injection greatly affects engine torque, and the pilot injection greatly affects combustion noise. However, there is a case that the combustion noise is affected by the main injection, or the engine torque is affected by the pilot injection.

The combustion pressure sensor 20 may measure real combustion pressure in the combustion chamber 12, and the measured combustion pressure is transmitted to the controller 50.

The controller 50 may be implemented by one or more processors operated by a predetermined program, in which the predetermined program is set to perform steps of the method for controlling the engine according to an exemplary embodiment of the present disclosure The controller 50 may convert the real combustion pressure measured by the combustion pressure sensor 20 into a CNI (combustion noise index) through a predetermined process.

Figure 2:
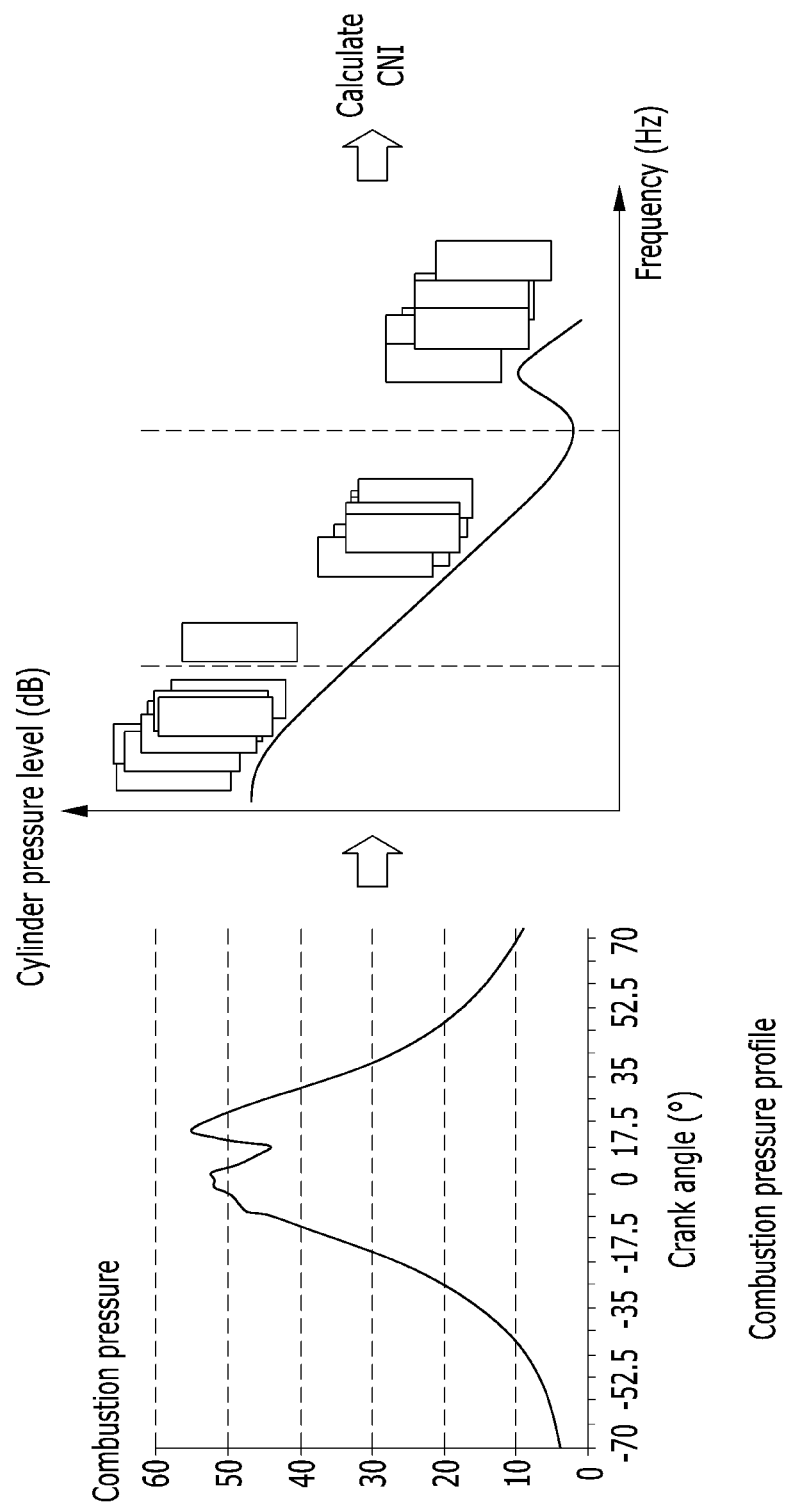
FIG. 2 is a graph illustrating a relationship between combustion pressure and combustion noise index according to an exemplary embodiment of the present disclosure.

As shown in FIG. 2, the controller 50 may convert a real combustion pressure (refer to 'combustion pressure profile') into a combustion chamber pressure level (refer to 'cylinder pressure level)' having ⅓ octave band by FFT (Fast Fourier Transform).

The controller 50 may calculate the combustion noise index by extracting a level of specific frequency at the ⅓ octave band. For example, the specific frequency may be 1, 1.25, 1.6, 2, 2.5, 3.15 kHz, the combustion noise index may be calculated from the following equation using the combustion chamber pressure level of the specific frequency.

$$\text{CNI(db)} = 10*\text{LOG}(10^{(1\ kHz\ level/10)} + 10^{(1.25\ kHz/10)} + 10^{(1.6\ kHz/10)} + 10^{(2\ kHz/10)} + 10^{(2.5\ kHz/10)} + 10^{(3.15\ kHz/10)})$$

The controller 50 may determine a target combustion noise index from engine speed, fuel amount injected into the combustion chamber, gear shift stage, external temperature and coolant temperature detected by the driving information detector 40. The target combustion noise index may be determined from one or more experiments regarding engine speed, fuel amount injected into the combustion chamber 12, gear shift stage, external temperature, and coolant temperature.

The controller 50 may compare the calculated combustion noise index to the target combustion noise index, and determine that abnormal combustion has occurred in the combustion chamber 12 when a difference between the calculated combustion noise index and the target combustion noise index is greater than a predetermined value (for example, 7 dB). The controller 50 may suppress abnormal combustion by controlling main injection timing of fuel injection into the combustion chamber 12, injection pressure, and pilot fuel amount. Here, the predetermined value may be determined by an experiment, or through existing data, when the engine 10 is designed or tested.

The controller 50 may compare again the calculated combustion noise index to target combustion noise index after controlling main injection timing, injection pressure, and pilot fuel amount. When the difference between the calculated combustion noise index and the target combustion noise index is greater than the predetermined value, the controller 50 may determine that combustion noise is not suppressed by controlling main injection timing, injection pressure, and pilot fuel amount, and combustion noise is increased compared to a reference value for other reasons.

For example, the controller 50 may determine that the injector 30 is inoperable (or, is out of order) or refueling fuel is faulty from a refueling timing. That is, the controller 50 may determine that refueled fuel is faulty when the refueling timing is within a predetermined time, and the injector 30 is inoperable when the refueling timing is out of the predetermined time.

The controller 50 may display that the injector 30 is inoperable or the refueled fuel is faulty to a driver through a cluster, etc.

Hereinafter, a method for controlling an engine according to an exemplary embodiment of the present disclosure will described in detail with reference to accompanying drawings.

FIG. 3 is a flowchart illustrating a method for controlling an engine according to an exemplary embodiment of the present disclosure.

As shown in FIG. 3, the combustion pressure sensor 20 may detect an internal combustion pressure of combustion chamber 12 at step S10. The measured combustion pressure may be transmitted to the controller 50.

The controller 50 may calculate a CNI (combustion noise index) from the measured combustion pressure at step S20. A method for calculating the combustion noise index is the same as described above, and a detailed description will be omitted here.

The controller 50 may compare the calculated combustion noise index to the target combustion noise index at step S30.

When a difference between the calculated and the target combustion noise index is greater than a predetermined value, the controller 50 may determine that abnormal combustion has occurred, and control main injection timing, injection pressure, and pilot fuel amount at step S40.

The controller 50 may compare the calculated combustion noise index to the target combustion noise index at step S50 after controlling main injection timing, injection pressure, and pilot fuel amount. The controller 50 may be able to determine whether abnormal combustion is suppressed or not by controlling main injection timing, injection pressure, and pilot fuel amount through the step S50.

When the difference between the calculated combustion noise index and the target combustion noise index is greater than the predetermined value, the controller 50 may determine that the abnormal combustion is not suppressed by controlling main injection timing, injection pressure, and pilot fuel amount. That is, the controller 50 may determine that the abnormal combustion cannot be suppressed by simply controlling injection timing, fuel amount, injection pressure, and may determine whether refueled fuel is faulty or the injector 30 is inoperable.

Thus, the controller 50 can measure current time and refueling timing, and determine whether a difference between the current time and the refueling timing is greater than a predetermined time at step S60.

When the difference between the current time and the refueling timing is less than the predetermined time (for example, a state in which a time from refueling timing to current time is short), the controller 50 may determine that the refueled fuel is faulty at step S70.

When the difference between the current time and the refueling timing is greater than the predetermined time (for example, a state in which a time from refueling timing to current time is long), the controller 50 may determine that the injector 30 is inoperable at step S80.

Finally, the controller 50 may display that the refueled fuel is faulty or that the injector 30 is inoperable through a cluster.

As described above, according to an exemplary embodiment of the present disclosure, since main injection timing, injection pressure, and pilot fuel amount are controlled by using the combustion noise index, abnormal combustion can be suppressed.

Further, when the abnormal combustion is not suppressed by controlling main injection timing, injection pressure, and pilot fuel amount, the controller can determine that the refueled fuel is faulty or the injector 30 is inoperable, and display the above problems through a cluster so as to warn to the driver.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for controlling an engine comprising:
a combustion pressure sensor that measures an internal combustion pressure of a combustion chamber of the engine;
an injector that injects fuel into the combustion chamber; and
a controller configured to convert the combustion pressure measured by the combustion pressure sensor into a combustion noise index (CNI), and control main injection timing, injection pressure, and pilot fuel amount injected by the injector using the combustion noise index,
wherein when a difference between the measured combustion noise index and a target combustion noise index is greater than a predetermined value, the controller is configured to determine that abnormal combustion is generated and control main injection timing, injection pressure, and pilot fuel amount,
wherein when the difference between the measured combustion noise index and the target combustion noise index is greater than the predetermined value after the main injection timing, the injection pressure, and the pilot fuel amount are controlled, then the controller is configured to determine that the injector is inoperable or a refueling fuel is faulty from a refueling timing, and
wherein the controller is configured to determine that the refueling fuel is faulty when a difference between the refueling timing and current time is less than a predetermined time, and the injector is inoperable when the difference between the refueling timing and current time is greater than the predetermined time.

2. The apparatus of claim 1, wherein the controller calculates the CNI by converting the combustion pressure sensor through FFT (Fast Fourier Transformation).

3. The apparatus of claim 1, wherein the target combustion noise index is determined by an experiment according to one or more variables selected from the group consisting of engine speed, fuel amount injected into the combustion chamber, gear shift stage, external temperature and coolant temperature.

4. A method for controlling an engine comprising:
measuring an internal combustion pressure of a combustion chamber of an engine;
converting the combustion pressure into a combustion noise index;
comparing the combustion noise index to a target combustion noise index;

determining whether a difference between the combustion noise index and the target combustion noise index is greater than a predetermined value;

controlling main injection timing, injection pressure, and pilot fuel amount when the difference between the combustion noise index and the target combustion noise index is greater than the predetermined value; and after the steps of controlling main injection timing, injection pressure, and pilot fuel amount and comparing the combustion noise index to the target combustion noise index:

determining refueling timing; and determining the injector is inoperable or a refueling fuel is faulty from a refueling timing, wherein it is determined that the refueling fuel is faulty when a difference between the refueling timing and current time is less than a predetermined time, and the injector is inoperable when the difference between the refueling timing and current time is greater than the predetermined time.

5. The method of claim 4, wherein the combustion noise index is calculated by converting the combustion pressure through FFT (Fast Fourier Transform).

6. The method of claim 4, wherein the target combustion noise index is determined by a test according to one or more variables selected from the group consisting of engine speed, fuel amount injected into the combustion chamber, gear shift stage, external temperature and coolant temperature.

* * * * *